(12) United States Patent
Sopper et al.

(10) Patent No.: US 7,189,003 B2
(45) Date of Patent: Mar. 13, 2007

(54) TURBOMACHINE

(75) Inventors: Alfred Sopper, Kerpen (DE); Martin Leonhard, Brühl (DE)

(73) Assignee: Atlas Copco Energas GmbH, Köln (DE)

( * ) Notice: Subject to any disclaimer, the term of this patent is extended or adjusted under 35 U.S.C. 154(b) by 127 days.

(21) Appl. No.: 11/121,645

(22) Filed: May 4, 2005

(65) Prior Publication Data

US 2005/0249442 A1    Nov. 10, 2005

(30) Foreign Application Priority Data

May 7, 2004   (DE) .................... 10 2004 023 149

(51) Int. Cl.
*F16C 32/06* (2006.01)
(52) U.S. Cl. ...................... 384/121; 384/100
(58) Field of Classification Search ............... 384/100, 384/102, 105, 121; 415/104–406
See application file for complete search history.

(56) References Cited

U.S. PATENT DOCUMENTS

| 4,167,295 | A | * | 9/1979 | Glaser ......................... 384/105 |
| 5,980,114 | A | * | 11/1999 | Oklejas, Jr. ................. 384/123 |
| 6,036,435 | A | * | 3/2000 | Oklejas ....................... 415/106 |
| 6,851,862 | B2 | * | 2/2005 | Gozdawa ..................... 384/121 |

* cited by examiner

*Primary Examiner*—Thomas R. Hannon
(74) *Attorney, Agent, or Firm*—Collard & Roe, P.C.

(57) ABSTRACT

A turbomachine has a rotor shaft, which is mounted in a bearing arrangement containing a hydrodynamic axial bearing, and a rotor disposed on the rotor shaft. A hydrostatic axial bearing is additionally provided in the immediate vicinity of the hydrodynamic axial bearing, the hydrostatic axial bearing absorbing the axial force acting on the rotor shaft at rest, completely or at least for the most part, relieving stress on the hydrodynamic axial bearing during start-up processes of the rotor shaft, and being shut off during operation at the rated speed of rotation.

6 Claims, 2 Drawing Sheets

TURBOMACHINE

CROSS REFERENCE TO RELATED APPLICATIONS

Applicants claim priority under 35 U.S.C. §119 of German Application No. 10 2004 023 149.4 filed May 7, 2004.

BACKGROUND OF THE INVENTION

1. Field of the Invention

The present invention relates to a turbomachine having a rotor shaft, which is mounted in a bearing arrangement containing a hydrodynamic axial bearing, and having a rotor disposed on the rotor shaft. The term "hydrodynamic axial bearing" refers to commercially available axial slide bearings that are frequently used in turbomachine construction.

2. The Prior Art

In known turbomachines known having the characteristics described initially, the hydrodynamic axial bearing serves two purposes. The hydrodynamic axial bearing serves both to absorb the axial forces that occur when the rotor shaft is not moving, and to absorb the axial thrusts that occur during operation of the turbomachine. The axial thrusts depend on the pressure conditions at the rotor, the type of rotor, as well as on the shaft seal geometry. In the case of turbomachines configured as compressors, in particular, the high pre-pressure of the fluid to be compressed results in high axial thrusts when the machine is at rest, and thereby also when the machine is started up. In the design of the hydrodynamic axial bearing, there is therefore the problem that the hydrodynamic axial bearing must absorb the axial forces that occur during the stopped state and during start-up of the turbomachine, and the axial forces that occur during operation at the rated speed of rotation. A design of the hydrodynamic axial bearing coordinated only with operation at the rated speed of rotation is therefore not possible, so that corresponding disadvantages with regard to the dissipated energy of the bearing as well as its dimensioning have to be accepted.

SUMMARY OF THE INVENTION

It is an object of the present invention to provide a turbomachine having the characteristics described initially, which allows a design and construction of the hydrodynamic axial bearing that is optimally coordinated with the operating conditions at the rated speed of rotation.

These and other objects are achieved, according to the invention, by additionally providing a hydrostatic axial bearing in the immediate vicinity of the hydrodynamic bearing. The hydrostatic axial bearing absorbs the axial force acting on the rotor shaft at rest, completely or at least for the most part, relieves stress on the hydrodynamic axial bearing during start-up processes, and is shut off during operation at the rated speed of rotation.

According to the invention, a division of the components that absorb the axial thrust takes place. The components are divided into a static part that absorbs the axial force acting on the rotor shaft at rest and during start-up, completely or at least for the most part, and a hydrodynamic part whose design and construction can be optimally coordinated with the conditions that prevail during operation at the rated speed of rotation. This arrangement particularly allows a reduction in the dissipated energy of the hydrodynamic axial bearing at rated operation, as well as dimensioning of the hydrodynamic axial bearing that is optimally coordinated with the axial thrusts that occur at rated operation. At rest and during the start-up process, the hydrodynamic axial bearing is relieved of stress, to a great extent, by the additional hydrostatic axial bearing. When the rotor shaft has reached its rated speed of rotation, the static axial bearing is shut off, and thereby becomes ineffective, and the axial thrust is completely absorbed by the hydrodynamic axial bearing.

Preferably, the two axial bearings are disposed at a free end of the rotor shaft. It is practical if the hydrostatic axial bearing has a fixed piston that absorbs the axial forces, whose face is directed at the face of the corresponding rotor shaft end, whereby a bearing fluid that is under pressure is located between the two faces while the rotor shaft is at rest and during the start-up process, which fluid separates the two surfaces, putting them at a distance from one another. It is advantageous if the distance between the two surfaces is approximately 50 µm, whereby a deviation of 10 µm up or down is acceptable. The piston, which is configured as an insert, can have a bore for the supply of the bearing fluid into the interstice between the two faces. Preferably, the piston is inserted into a sleeve and connected therewith. The sleeve is attached to a housing of the turbomachine and transfers the axial forces absorbed by the piston to the housing. The end of the sleeve that faces the rotor shaft simultaneously serves to introduce the axial forces transferred by the hydrodynamic axial bearing into the housing.

The rotor shaft can have a segment configured as a pinion, which forms a gear arrangement with a gear wheel disposed on a second shaft, whereby an electric machine is connected with the second shaft. Alternatively, however, the electric machine may also be directly connected with the rotor shaft.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
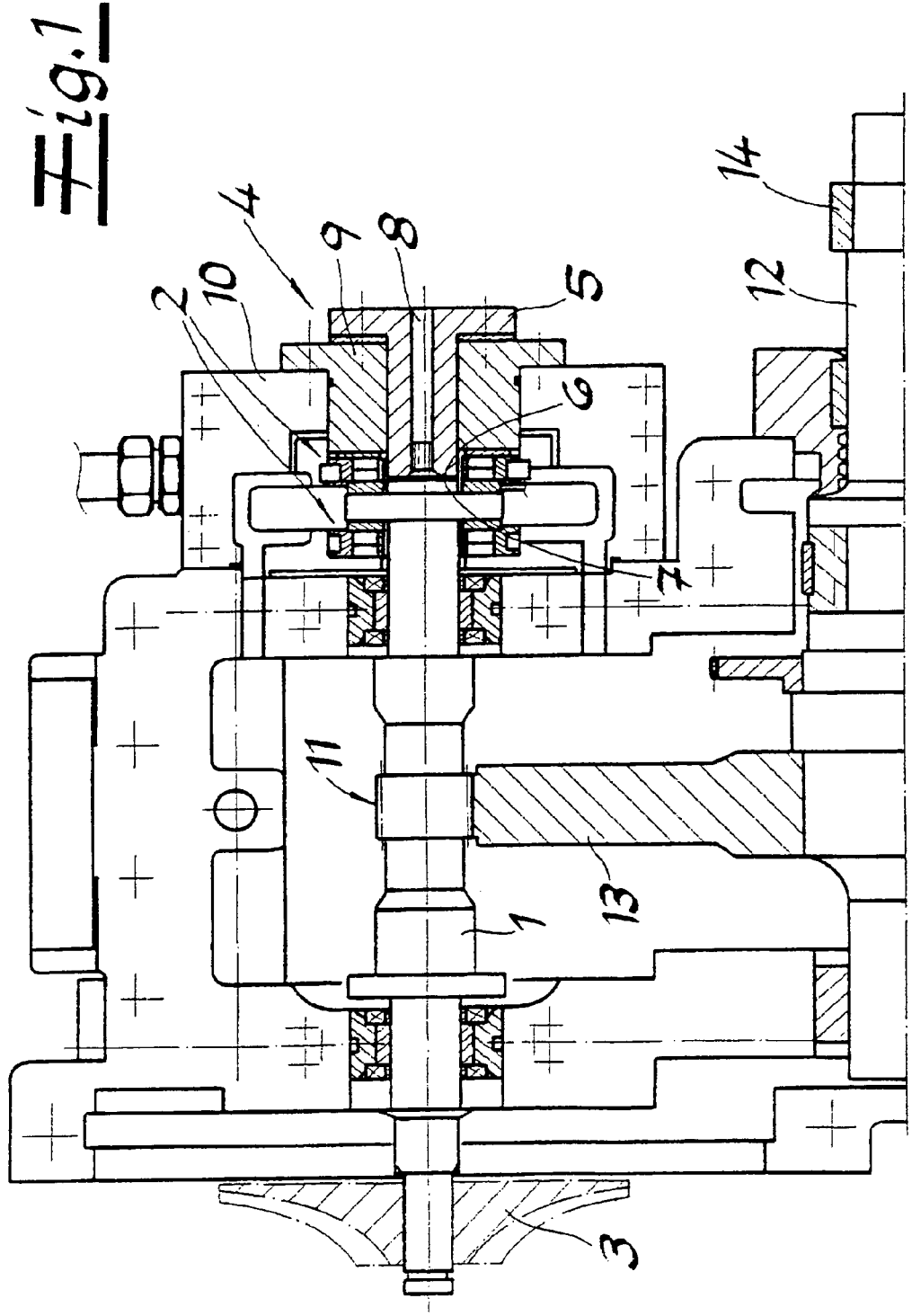
FIG. 1 is a cross-sectional representation of an embodiment of a turbomachine according to the invention.

Referring now to the drawings, FIG. 1 shows a turbomachine configured as a compressor, having a rotor shaft 1. Rotor shaft 1 is mounted in a bearing arrangement containing a hydrodynamic axial bearing 2. At one end of rotor shaft 1, a compressor rotor 3 is disposed in cantilevered manner.

Figure 2:
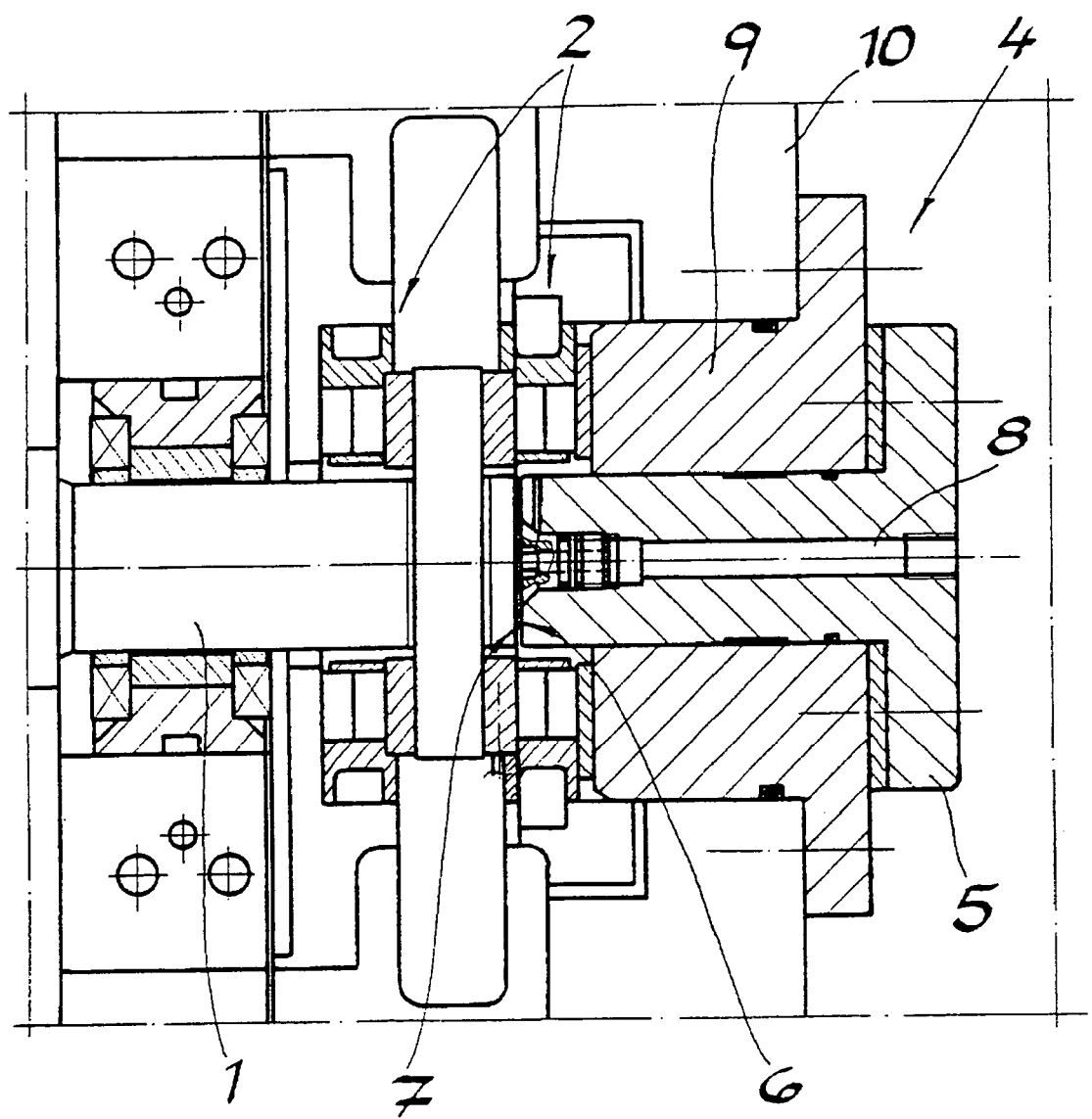
FIG. 2 is an enlarged detail of FIG. 1.

In the immediate vicinity of hydrodynamic axial bearing 2, a hydrostatic axial bearing 4 is additionally provided. Hydrostatic axial bearing 4 absorbs the axial force that acts on rotor shaft 1 when it is at rest, completely or at least for the most part. During start-up processes of rotor shaft 1, stress on hydrodynamic axial bearing 2 is relieved by axial bearing 4, while axial bearing 4 is shut off during operation at the rated speed of rotation. The two axial bearings 2, 4 are disposed on the remaining free end of rotor shaft 1. It is particularly evident from FIG. 2 that hydrostatic axial bearing 4 has a fixed piston 5 that absorbs the axial forces, the face 6 of which is directed at the face 7 of the corresponding rotor shaft end. While rotor shaft 1 is at rest and during the start-up process, a bearing fluid that is under pressure is located between the two faces 6, 7. The bearing fluid causes the two surfaces 6, 7 to be at a distance from one another. When hydrostatic axial bearing 4 is shut off after the rated speed of rotation has been reached, this pressure relaxes, and the axial thrust is then completely absorbed by hydrodynamic axial bearing 2.

Piston 5 has a bore 8 to supply the bearing fluid into the interstice between the two faces 6, 7. Piston 5 is inserted into a sleeve 9 and connected with it. Sleeve 9 is attached to a housing 10 of the turbomachine and transfers the axial forces absorbed by piston 5 to housing 10. At the same time, the end of sleeve 9 that faces rotor shaft 1 serves to introduce the axial forces absorbed by hydrodynamic axial bearing 2 into housing 10.

As evident from FIG. 1, rotor shaft 1 has a segment configured as a pinion 11, which forms a gear arrangement with a gear wheel 13 disposed on a second shaft 12. A rotor of a drive machine 14 is disposed at a cantilevered end of second shaft 12.

Although at least one embodiment of the present invention has been shown and described, it is to be understood that many changes and modifications may be made thereunto without departing from the spirit and scope of the invention as defined in the appended claims.

What is claimed is:

1. A turbomachine comprising:
   (a) a bearing assembly comprising a hydrodynamic axial bearing;
   (b) a rotor shaft mounted in said bearing assembly;
   (c) a rotor disposed on said rotor;
   (d) a hydrostatic axial bearing provided near said hydrodynamic axial bearing, said hydrostatic axial bearing absorbing at least most axial force acting on said rotor shaft at rest, relieving stress on said hydrodynamic axial bearing during start-up of said rotor shaft, and being shut off during operation at a rated speed of rotation.

2. The turbomachine according to claim 1, wherein said axial bearings are disposed on a free end of the rotor shaft.

3. The turbomachine according to claim 2, wherein said rotor shaft has a rotor shaft face and the hydrostatic axial bearing has a fixed piston that absorbs axial forces, said piston having a piston face directed at the rotor shaft face, wherein a bearing fluid that is under pressure is located between said faces while the rotor shaft is at rest and during start-up, said bearing fluid separating said faces by a distance from one another.

4. The turbomachine according to claim 3, wherein in the piston has a bore for supply of the bearing fluid into an interstice between said faces.

5. The turbomachine according to claim 3, further comprising a housing and a sleeve attached to said housing and having an end facing said rotor shaft, wherein the piston is inserted into and connected with said sleeve, said sleeve transferring the axial forces absorbed by the piston to the housing, the end of the sleeve facing the rotor shaft simultaneously serving to introduce axial forces transferred by the hydrodynamic axial bearing into the housing.

6. The turbomachine according to claim 1, wherein the rotor shaft has a segment comprising a pinion, said pinion forming a gear arrangement with a gear wheel disposed on a second shaft connected with a drive machine.

\* \* \* \* \*